Patented Feb. 3, 1953

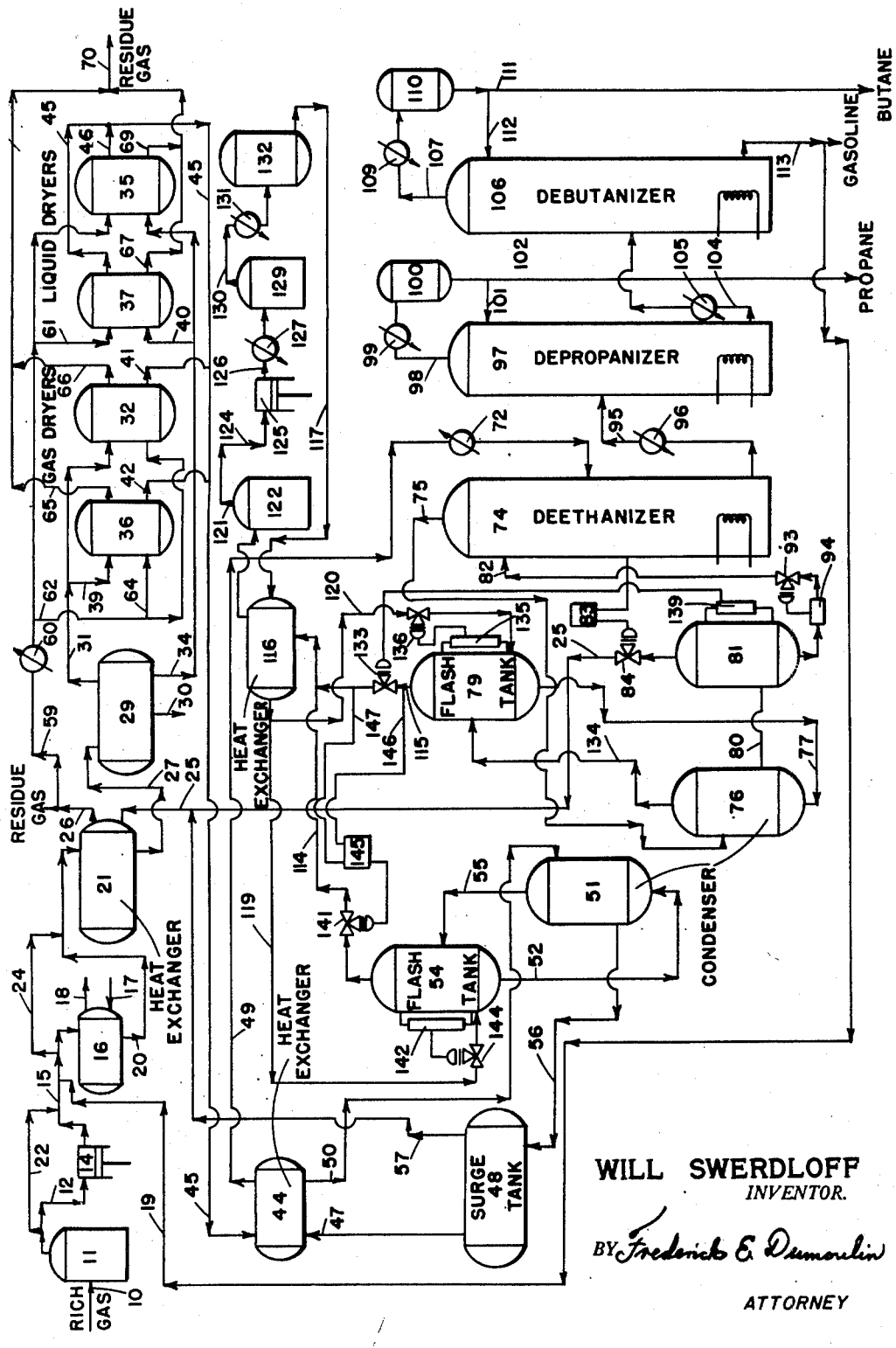

2,627,318

UNITED STATES PATENT OFFICE 2,627,318

REFRIGERATION METHOD OF RECOVERING HYDROCARBONS FROM GAS MIXTURES

Will Swerdloff, Dallas, Tex., assignor, by mesne assignments, to Socony-Vacuum Oil Company, Incorporated, New York, N. Y., a corporation of New York Application August 8, 1949, Serial No. 109,136

13 Claims. (Cl. 183—114.2)

This invention relates to the separation and recovery of desired constituents from gaseous mixtures and relates more particularly to the separation and recovery of hydrocarbon constituents from natural gas and other gaseous mixtures by procedures involving refrigeration.

It is well known that desired constituents may be separated and recovered from gaseous mixtures by refrigeration or compression and refrigeration of the gaseous mixtures whereby the more condensable constituents are condensed to the liquid form and separated from the less condensable constituents. Thereafter, the condensed constituents may be fractionated or otherwise treated to separate a particular constituent or particular constituents from the condensed portion of the gaseous mixtures. Thus, natural gas or other hydrocarbon gas mixtures have been refrigerated, or compressed and refrigerated particularly where the gas mixtures originate from comparatively low pressure sources, to separate and recover therefrom a liquid fraction which may contain, as the least condensable constituent of the liquid fraction depending upon the extent of the compression or the refrigeration, the greater portion of the ethane, propane, butane or other higher boiling hydrocarbon contained in the original gas mixture. The liquid fraction is then fractionated to separate the individual constituents or to obtain mixtures of particular constituents. This process has been employed extensively for the treatment of hydrocarbon gas mixtures containing propane and heavier constituents to separate and recover the propane and the butane for use as liquefied gas and the heavier constituents for use as gasoline or gasoline components. My invention is particularly directed to the economical separation and recovery of these constituents from hydrocarbon gas mixtures.

It is an object of this invention to provide a process for the separation and recovery of desired constituents from gas mixtures. It is another object of this invention to provide a method for the recovery of constituents of gaseous hydrocarbon mixtures. It is another object of this invention to separate and recover propane, butane, and gasoline from gas mixtures containing these constituents. It is another object of this invention to provide a refrigeration control system. It is a particular object of this invention to provide a process and apparatus for obtaining maximum utilization of refrigeration capacity in a plant treating hydrocarbon gas for separation and recovery of particular constituents of the hydrocarbon gas. Other objects of this invention will become apparent from the following description thereof.

The accompanying figure is a diagrammatic flowsheet illustrating apparatus for carrying out the present invention.

Referring now to the figure, the gas to be treated enters the system through line 10. This gas may be any hydrocarbon gas containing a plurality of constituents, at least two of which will condense to the liquid phase under the refrigeration conditions employed and at least one of which is to be separated from the condensed liquid phase by distillation. Gaseous hydrocarbon mixtures which may be treated include natural gas of the type known as wet or distillate gas, casinghead gas, i. e., gas produced concomitantly with crude petroleum oil, gas obtained from processes involving cracking or other treatment of petroleum oil or petroleum oil fractions, and other like gases. For purposes of description, the gas entering through line 10 will be assumed to be casinghead gas containing methane, ethane, propane, butane, and heavier gasoline hydrocarbons. The constituents to be condensed are substantially all of the propane and heavier hydrocarbons and lesser amounts of the ethane and methane, and subsequently the ethane, the propane, and the butane are to be separately removed from the condensed liquid phase.

The entering rich gas first passes through scrubber 11, where any liquid constituent is removed therefrom, and leaves the scrubber through line 12 leading to compressor 14. In compressor 14, the gas is compressed to a suitably high pressure, in accordance with the procedures customarily employed in the art, and the compressed gas is passed through line 15 to heat exchanger 16 where it is cooled with water entering through line 17 and leaving through line 18. A satisfactory temperature and pressure of the gas leaving heat exchanger 16 may be, for example, about 90° F. and 275 pounds per square inch absolute, respectively. To assist in condensation of the heavier constituents of the feed gas in subsequent cooling steps, liquid gasoline obtained from a source to be described later may be added through line 19 to the feed gas entering heat exchanger 16. The cooled gas is next passed through line 20 leading to heat exchanger 21. Where the gas entering the system through line 10 is at a sufficiently high pressure, further compression may not be required, and, in this case, the gas may be bypassed from line 12 to line 15 through line 22. Similarly, if the incoming gas is sufficiently cool, cooling by water may not be required, and the gas may be bypassed through line 24 from line 15 to line 20. While one stage of compression and scrubbing is shown, it will be understood that a plurality of stages as required or desired may be employed.

Cold residue gases are available from sources to be described later and, in heat exchanger 21, the feed gas entering through line 20 is cooled with cold residue gas, the cold residue gas entering through line 25 and leaving through line 26, to remove at least a portion of the water vapor from the feed gas. Cooling of the feed gas in heat exchanger 21, however, should be above a temperature at which hydrocarbon hydrates will form in order that clogging of tubing and piping will be avoided. A liquid hydrocarbon phase will also condense under the cooling conditions employed for condensing water and the gas and liquid hydrocarbons along with the water leave heat exchanger 21 through line 27 and pass to dryer feed tank 29. Condensed water settles to the bottom of tank 29 and is removed from the tank through line 30.

To prevent formation of hydrocarbon hydrates in the subsequent cooling steps, the gas and liquid hydrocarbons are treated for the further removal of water, and I have found that drying may be accomplished more conveniently and effectively if the gas phase and liquid phase are dried separately. In accordance with one feature of the invention, therefore, the gas phase and the liquid phase are separated in dryer feed tank 29 and the two phases passed separately to dryers for removal of water. The gas phase is passed from the top of tank 29 through line 31 to gas dryer 32 and the liquid phase is passed from the bottom of tank 29 through line 34 to liquid dryer 35. In order to maintain continuous operation, an additional gas dryer 36 and an additional liquid dryer 37 are provided so that one dryer for each phase may be available for drying while the other dryer is being regenerated, and gas dryer 36 is fed from line 39 connected to line 31 and liquid dryer 37 is fed from line 40 connected to line 34. The dryers are packed with any suitable type of solid desiccant capable of removing water from gaseous and liquid hydrocarbons. Downward flow is employed in the gas dryers in order to obtain greater throughput, but upward flow is employed in the liquid dryers in order to decrease the possibility of entrained water loading the desiccant. The dried gas leaves dryers 32 and 36 through lines 41 and 42, respectively, and is joined with the dried liquid leaving dryers 35 and 37 through lines 44 and 45, respectively. The joined gas and liquid streams are passed to heat exchanger 46 where further cooling is effected with cold raw gasoline entering the heat exchanger through line 47 from surge tank 48 and leaving the heat exchanger through line 49. The cooled hydrocarbons from heat exchanger 46 are passed through line 50 to rich gas condenser 51 where they are finally refrigerated with boiling propane refrigerant supplied through line 52 from rich gas refrigerant flash tank 54. The temperature of the cooled hydrocarbons leaving condenser 51 may be, for example, about −15 to about +15° F. Propane vapors leave the top of condenser 51 and return to the flash tank 54 through line 55.

The refrigerated hydrocarbons leave condenser 51 through line 56 and enter surge tank 48. Uncondensed gases, such as methane, are removed as residue gas from the top of the surge tank through line 57 and pass to line 25 for cooling of the gas in condenser 21, as previously described. The residue gas in line 26 from heat exchanger 21 is dry, having previously passed through the dryers and, accordingly, is highly suitable for regeneration of the gas and liquid dryers. Additionally, being dry, the direction of flow of gas need not be reversed after regeneration heating is completed in order to cool the hot, regenerated bed of desiccant before placing the dryers back on stream. The residue gas is passed through line 59, heated in heater 60 to a suitable temperature, which may be of the order of 350° F., and thence passed to dryer 35, to dryer 37 through line 61, to dryer 32 through line 62, or to dryer 36 through line 64 connected to line 62, depending upon which dryer requires regeneration. The regeneration gas leaves dryer 36 through line 65, dryer 32 through line 66 connected to line 65, dryer 37 through line 67, and dryer 35 through line 69 connected to line 67, and thence through line 70 to be used for fuel or repressuring, or otherwise utilized or discarded.

The refrigerated raw gasoline leaves heat exchanger 46 through line 49, as previously mentioned, and is heated in heater 72 to a proper temperature for feeding to a deethanizer, which may be of the order of 100° to 125° F. for example, after which it enters deethanizer 74. Gaseous overhead from deethanizer 74 is passed through line 75 to deethanizer reflux condenser 76 where condensation is effected by cooling to a suitable temperature, for example, between about −10° F. and +20° F., with boiling propane refrigerant supplied through line 77 from deethanizer refrigerant flash tank 79. The condensate is passed through line 80 to reflux accumulator 81, and reflux is passed from the accumulator to the deethanizer through line 82. Line 25 from reflux accumulator 81 is provided with a back pressure controller 83 which is responsive to the pressure in the deethanizer and which operates valve 84, such as a motor operated valve, whereby the pressure in the deethanizer kettle is maintained constant.

The rate at which reflux is supplied to deethanizer 74 is governed by means of valve 93, which may be a motor operated valve, actuated by controller 94. The uncondensed portion of the overhead from deethanizer 74 is removed from the top of accumulator 81 through line 25 leading to heat exchanger 21. The bottoms from deethanizer 74 are passed through line 95 containing cooler 96 wherein they are cooled to a proper temperature for feeding to depropanizer 97. Gaseous propane overhead from depropanizer 97 passes through line 98 containing condenser 99 wherein the propane is condensed. The liquid propane enters reflux accumulator 100 from which a portion is withdrawn as reflux for the depropanizer through line 101 connected to line 102 and the remainder is passed to storage or otherwise through line 102. The bottoms from the depropanizer are passed through line 104 and cooled in cooler 105 to a proper temperature for feeding to debutanizer 106. Gaseous butane overhead from the debutanizer is passed through line 107, condensed in condenser 109, and then passed to reflux accumulator 110 from which the liquid butane is withdrawn through line 111 to storage or otherwise, a portion being returned as reflux to the debutanizer through line 112. The bottoms from debutanizer 106, consisting of gasoline, are withdrawn through line 113, a portion being returned through line 19 to the feed gas in line 15, as previously described.

Propane refrigerant vapors leave the top of flash tank 54 through line 114 where they are joined by propane refrigerant vapors leaving the top of deethanizer refrigerant flash tank 79 through line 115. The vapors in line 114, being at a low temperature, are passed through heat exchanger 116 where they cool liquid propane refrigerant which enters the heat exchanger through line 117 and leaves through line 119 and which supplies refrigerant to flash tank 54 and to flash tank 79 connected by line 120 to line 119. The vapors leave heat exchanger 116 through line 121, pass through scrubber 122 to remove any liquids that may be contained therein, leave the scrubber through line 124, and are compressed in compressor 125. The compressed vapors are passed through line 126 containing cooler 127, where at least a portion of the heat of compression is removed, and then passed to accumulator 129 where any oil picked up by the propane in the compressor is separated. While one stage of compression and cooling is shown, it will be understood that a plurality of stages may be employed. The vapors leave accumulator 129 through line 130 and pass through cooler 131 where they are condensed to the liquid state. The liquid propane is then passed to surge tank 132 from which it is withdrawn through line 117 for passage through heat exchanger 116 and for return through line 119 to flash tanks 54 and 79.

A particular feature of the invention resides in the method and apparatus for supplying refrigerant to the feed gas and to the overhead from the deethanizer. In order to obtain condensation of a specified proportion of the propane in the feed gas by any refrigeration process, the gas must be cooled to a specified temperature depending upon the pressure of the gas. This in turn requires a specified amount of refrigeration depending upon the amount of feed gas treated. Further, in order to prevent loss of propane with the lighter gases in the overhead from the deethanizer, a sufficient amount of reflux to the deethanizer must be provided. This, also, in turn, requires a specified amount of refrigeration depending upon the amount of feed gas treated. The required amount of refrigeration for both purposes can be supplied by providing sufficient refrigeration compressor and cooler capacity. But, where the rate at which the feed gas enters the system is not constant, the refrigeration capacity during those periods when the feed rate is low will be greater than the capacity required to refrigerate the gas at the low feed rate, representing an uneconomical investment in refrigerator capacity. In accordance with one of the objects of the invention, means are provided whereby excess refrigerator capacity is utilized and the yield of propane thereby increased.

Since a proper amount of reflux must be furnished to the deethanizer in order to avoid loss of propane previously separated from the residue gas by refrigerating to the liquid state, provision must be made to insure that the entire amount of refrigeration required for reflux purposes is supplied. This is accomplished by supplying refrigerant from line 119 through line 120 to deethanizer refrigerant flash tank 79 in amounts governed by the reflux demand, and controlling and coordinating the amount of refrigerant for condensing the raw gasoline with respect to the amount of refrigerant remaining after the reflux demand is met. The refrigerant feeds by gravity through line 77 to deethanizer reflux condenser 76 which is maintained at substantially the same pressure as the flash tank. Refrigeration is effected by permitting the propane refrigerant to boil by reduction of pressure on the refrigerant through pressure reduction valve 133 in line 115 leading from the flash tank. Propane vapors are returned from the reflux condenser through line 134 to the upper portion of the flash tank from which they leave through the line 115. Flash tank 79 is provided with a liquid level controller comprising pilot 135 responsive to changes in the level of liquid propane in the flash tank and valve 136, such as a motor operated valve, opening and closing in response to operation of the pilot whereby the level of liquid propane in the flash tank is maintained constant. Reflux accumulator 81 is provided with a pilot 139 responsive to the liquid level in the accumulator and this pilot actuates the valve 133, previously mentioned, which may be a motor operated valve. Valve 133 governs the pressure, and consequently the temperature, of the boiling refrigerant in flash tank 79 and with decrease in temperature of the boiling refrigerant there will be an increase in the rate of condensation of reflux in the condenser 76. Thus, the rate of condensation of reflux is controlled to maintain a constant liquid level in accumulator 81. By these means, sufficient refrigeration is supplied to meet the reflux requirements and the supply of refrigerant is governed by the reflux requirements.

The remainder of the propane refrigerant in line 119 enters rich gas refrigerant flash tank 54 and feeds by gravity through line 52 to rich gas condenser 51 which is maintained at substantially the same pressure as the flash tank 54. Refrigeration is effected by permitting the propane refrigerant to boil by reduction of pressure on the refrigerant through pressure reduction valve 141 in line 114 leading from the flash tank. Propane vapors are returned from the condenser through line 55 to the upper portion of the flash tank from which they leave through line 114 to be joined with the vapors from line 115. Flash tank 54 is provided with a liquid level controller comprising a pilot 142 responsive to changes in the liquid level in the flash tank and valve 144, such as a motor operated valve, opening and closing in response to the operation of the pilot whereby the level of liquid propane in the flash tank is maintained constant.

To control, coordinate, and obtain maximum utilization of the refrigerant, the pressure on the refrigerant in flash tank 54 and condenser 51, and hence its temperature and the rate at which it will enter flash tank 54, is correlated in accordance with the reflux demand. The reflux refrigeration demand is met by varying the pressure in reflux condenser 76 and flash tank 79 as the liquid level in reflux accumulator 81 varies by means of the pilot 139 and the valve 133. However, in order to obtain the required amount of refrigeration in condenser 76, the pressure differential between the refrigerant in the condenser and flash tank and return line 114 over the pressure reduction valve 133 must always exceed a certain minimum value, which may be any suitable desired value, for example, about 5 pounds per square inch, so that boiling of the refrigerant may not be restricted. Thus, the pressure drop across the valve 133 must always exceed this minimum value. To prevent too great an amount of refrigerant vapor from being produced in flash tank 54 and condenser 51 and entering line 114, which would make it impossible to maintain the required pressure differential across the valve 133, and in order to maintain the suction pressure of the refrigerant to compressor 125 as high as possible for the purpose of obtaining maximum output from the compressor, a back pressure is maintained on the refrigerant in flash tank 54 and condenser 51 and this back pressure is controlled to maintain the desired pressure differential over the valve 133. Line 114 is provided with the pressure reduction valve 141, previously mentioned, which may be a motor operated valve, which maintains a back pressure on the refrigerant in flash tank 54 and condenser 51, and the valve 141 is opened and closed by pressure responsive controller 145 connected by lines 146 and 147 across the valve 133. Thus, when only a small amount of rich gas enters condenser 51 and a small amount of refrigerant vapor would be passed from flash tank 54, the pressure drop across the valve 133 would be large because of the small amount of vapor in line 114, thereby causing controller 145 to open valve 141 resulting in lowering of the pressure and, hence, of the temperature of the refrigerant in flash tank 54 and condenser 51 with consequent increase of condensation of propane in the rich gas. When a large amount of rich gas enters the condenser 51, boiling will increase and the amount of vapor in line 114 will decrease the pressure drop across the valve 133 whereupon the controller 145 will close valve 141 sufficiently to maintain the desired pressure differential across the valve 133. It will be seen therefore that full utilization of the refrigeration system is obtained irrespective of fluctuation in the feed rate of the gas to be treated for removal of hydrocarbons.

Having thus described my invention, it will be understood that such description has been given by way of illustration and example only and not by way of limitation, reference for the latter purpose being had to the appended claims.

I claim:

1. In a process for treating a gas containing at least two constituents condensable to the liquid phase for the separation and recovery of at least one of said constituents, the steps comprising cooling said gas to a temperature sufficiently low to condense at least a portion of any water contained in said gas, separating any of said condensed water from the remaining constituents of said gas, separating non-aqueous liquid phase condensed from said gas as a result of said cooling from the remaining uncondensed portion of said gas, subjecting said liquid phase to the action of a first body of solid desiccant, subjecting the uncondensed portion of said gas to the action of a second body of solid desiccant, admixing said liquid phase with the remainder of said gas, refrigerating the resulting mixture to a temperature sufficiently low to condense at least all but the least condensable constituent of said mixture, separating said least condensable constituent from the resulting liquid phase, separating at least one constituent of said gas from said liquid phase by fractionation of said liquid phase, and recovering the remainder of said liquid phase.

2. In a process for treating a hydrocarbon gas containing at least ethane and propane for the separation and recovery of propane, the steps comprising cooling said gas to a temperature sufficiently low to condense at least a portion of any water contained in said gas, separating any condensed water from the remaining constituents of said gas, separating non-aqueous liquid phase condensed from said gas as a result of said cooling from the remaining uncondensed portion of said gas, subjecting said liquid phase to the action of a first body of solid desiccant, subjecting the uncondensed portion of said gas to the action of a second body of solid desiccant, admixing said liquid phase with the remainder of said gas, refrigerating the resulting mixture to a temperature sufficiently low to condense at least a portion of the ethane, separating any constituent less condensable than ethane from the resulting liquid phase, separating ethane from said liquid phase by fractionation of said liquid phase, and recovering said propane.

3. In a process for treating a hydrocarbon gas mixture containing methane, ethane, propane, butanes, and gasoline hydrocarbons for the separation and recovery of propane, butanes, and gasoline hydrocarbons therefrom, the step comprising cooling said gas mixture to a temperature sufficiently low to condense at least a portion of any water contained in said gas but above a temperature at which hydrocarbon hydrates will form, separating any condensed water from the remaining constituents of said gas, separating non-aqueous liquid phase condensed from said gas as a result of said cooling from the remaining uncondensed portion of said gas, subjecting said liquid phase to the action of a first body of solid desiccant, subjecting the uncondensed portion of said gas to the action of a second body of solid desiccant, admixing said liquid phase with the remainder of said gas, refrigerating the resulting mixture to a temperature sufficiently low to condense at least a portion of the ethane, separating methane from the resulting liquid phase, separating ethane from said liquid phase by fractionation of said liquid phase, thereafter separating propane from said liquid phase, thereafter separating butanes from said liquid phase, and recovering gasoline hydrocarbons.

4. In a process for treating a gas containing at least two constituents condensable to the liquid phase for the separation and recovery of at least one of said constituents, the steps comprising cooling said gas to a temperature sufficiently low to condense at least a portion of water contained in said gas but above a temperature at which hydrocarbon hydrates will form, separating any of said condensed water from the remaining constituents of said gas, subjecting the remaining constituents of said gas to the action of a desiccant, passing the remaining constituents of said gas to a refrigeration zone, passing a liquid refrigerant from a source of refrigerant to said refrigeration zone, boiling said liquid refrigerant in said refrigeration zone to condense the constituents of said gas more condensable than the least condensable of said two constituents of said gas condensable to the liquid phase, passing the refrigerant vapor produced by boiling from said refrigeration zone through a pressure reduction zone, separating from the resulting liquid phase said least condensable of said two constituents of said gas condensable to the liquid phase, fractionating said liquid phase in a fractionation zone to separate at least one constituent thereof, passing overhead from said fractionation zone to a refrigeration zone, passing a liquid refrigerant from said previously mentioned source to said last named refrigeration zone, boiling said liquid refrigerant in said last named refrigeration zone to condense said overhead, passing refrigerant vapor from said last named refrigeration zone through a pressure reduction zone, maintaining the pressure reduction of said vapor through said pressure reduction zone not less than a predetermined value, correlating the pressure reduction of said vapor through said first-named pressure reduction zone with the pressure reduction of said vapor through said last named pressure reduction zone, combining refrigerant vapors from both said refrigeration zones, condensing said vapors by compression and removal of heat of compression therefrom, returning said condensed refrigerant to said source, returning at least a part of said condensed overhead as reflux to said fractionation zone, and recovering bottoms from said fractionation zone.

5. In a process for treating a gas containing a plurality of constituents wherein said gas is cooled in a rich gas condensation zone to condense at least two constituents to the liquid phase, at least one of said constituents is separated from said liquid phase by fractionation, and at least a portion of said separated constituent is condensed to the liquid phase by cooling in a reflux condensation zone and returned to the fractionation operation as reflux, the improvement in providing refrigeration for both said cooling steps comprising passing a portion of a stream of liquid refrigerant from a refrigerant source to said reflux condensation zone, boiling said refrigerant in said reflux condensation zone, passing refrigerant vapor from said reflux condensation zone through a pressure reduction zone, varying the pressure on said liquid refrigerant in said reflux condensation zone in proportion to the amount of reflux required, passing the remaining portion of said stream of liquid refrigerant to said rich gas condensation zone, boiling said refrigerant in said rich gas condensation zone, passing refrigerant vapor from said rich gas condensation zone through a pressure reduction zone, correlating the pressure reduction of said vapor through said last named pressure reduction zone with the pressure reduction of said vapor through said first named pressure reduction zone, combining the refrigerant vapors from said first named and said second named pressure reduction zones, condensing said refrigerant vapors to the liquid phase by compression and cooling, and returning said liquid refrigerant to said refrigerant source.

6. In a process for treating a hydrocarbon gas mixture containing ethane, propane, butanes, and gasoline hydrocarbons to separate and recover the propane and higher hydrocarbons wherein said gas is cooled in a rich gas condensation zone to condense at least a portion of ethane and substantially all the higher hydrocarbons to the liquid phase, ethane is separated from said liquid phase by fractionation, and at least a portion of said separated ethane is condensed to the liquid phase by cooling in a reflux condensation zone and returned to the fractionation operation as reflux, the improvement in providing refrigeration for both said cooling steps comprising passing a portion of a stream of liquid refrigerant from a refrigerant source to said reflux condensation zone, boiling said refrigerant in said reflux condensation zone, passing refrigerant vapor from said reflux condensation zone through a pressure reduction zone, varying the pressure zone on said liquid refrigerant in said reflux condensation in proportion to the amount of reflux required, passing the remaining portion of said stream of liquid refrigerant to said rich gas condensation zone, boiling said refrigerant in said rich gas condensation zone, passing refrigerant vapor from said rich gas condensation zone through a pressure reduction zone, correlating the pressure reduction of said vapor through said last named pressure reduction zone with the pressure reduction of said vapor through said first named pressure reduction zone, combining the refrigerant vapors from said first named and said second named pressure reduction zones, condensing said refrigerant vapors to the liquid phase by compression and cooling, and returning said liquid refrigerant to said refrigerant source.

7. In a process for treating a hydrocarbon gas mixture containing ethane, propane, butanes, and gasoline hydrocarbons to separate and recover the propane and higher hydrocarbons wherein said gas is cooled in a rich gas condensation zone to condense at least a portion of the ethane and substantially all the higher hydrocarbons to the liquid phase, ethane is separated from said liquid phase by fractionation, and at least a portion of said separated ethane is condensed to the liquid phase by cooling in a reflux condensation zone and returned to the fractionation operation as reflux, the improvement in providing refrigeration for both said cooling steps comprising passing a portion of a stream of liquid refrigerant from a refrigerant source to said reflux condensation zone, boiling said refrigerant in said reflux condensation zone, passing refrigerant vapor from said reflux condensation zone through a pressure reduction zone, varying the pressure zone on said liquid refrigerant in said reflux condensation in proportion to the amount of reflux required but maintaining the pressure reduction of said refrigerant vapor passing through said pressure reduction zone not less than a minimum predetermined value, passing the remainder of said stream of liquid refrigerant to said rich gas condensation zone, boiling said refrigerant in said rich gas condensation zone, passing refrigerant vapor from said rich gas condensation zone through a pressure reduction zone, correlating the pressure reduction of said vapor through said last named reduction zone with the pressure reduction of said vapor through said first named pressure reduction zone, combining the refrigerant vapors from said first named and said last named pressure reduction zones, condensing said refrigerant vapors to the liquid phase by compression and cooling, and returning said liquid refrigerant to said refrigerant source.

8. Apparatus for supplying refrigerant to a rich gas condensation zone for the condensation of a gas mixture to the liquid phase and to a reflux condensation zone for providing reflux for fractionation of the liquid phase produced in said rich gas condensation zone comprising a source for liquid refrigerant, means for conveying refrigerant from said source to said rich gas condensation zone and said reflux condensation zone, means for conveying refrigerant vapors from said reflux condensation zone, means associated with said last named means for varying the pressure on said liquid refrigerant in said reflux condensation zone responsive to the amount of reflux required for said fractionation, means for conveying refrigerant vapors from said rich gas condensation zone, and means associated with said last named means for varying the reduction of pressure of said refrigerant vapors from said rich gas condensation zone responsive to the pressure reduction of said refrigerant vapors from said reflux condensation zone.

9. Apparatus for supplying refrigerant to a rich gas condensation zone for the condensation of a gas mixture to the liquid and to a reflux condensation zone for supplying reflux for fractionation of the liquid phase produced in said rich gas condensation zone comprising a source for liquid refrigerant, means for conveying refrigerant from said source to said rich gas condensation zone and said reflux condensation zone, means for conveying refrigerant vapors from said reflux condensation zone, valve means through which refrigerant vapors flow associated with said last named means for varying the pressure on said refrigerant in said reflux condensation zone, control means responsive to the amount of reflux required for fractionation for varying the setting of said valve means, means for conveying refrigerant vapors from said rich gas condensation zone, valve means associated with said last named means for varying the reduction of pressure of said refrigerant vapors from said rich gas condensation zone, and control means responsive to the reduction of pressure of refrigerant vapor flowing through said first named valve means for varying the setting of said last named valve means.

10. Apparatus for supplying refrigerant to a rich gas condensation zone for the condensation of a gas mixture to the liquid phase and to a reflux condensation zone for supplying reflux for fractionation of the liquid phase produced in said rich gas condensation zone comprising a source for liquid refrigerant, conduits from said source to said rich gas condensation zone and said reflux condensation zone, outlet conduits for refrigerant vapors from said rich gas condensation zone and said reflux condensation zone, valve means in said outlet conduit from said reflux condensation zone, control means for varying the setting of said valve means responsive to the amount of reflux required for said fractionation, valve means in said outlet conduit from said rich gas condensation zone, and control means for varying the setting of said last named valve means responsive to pressure reduction of refrigerant vapors passing through said first named valve means.

11. Apparatus for supplying refrigerant to a rich gas condensation zone for the condensation of a gas mixture to the liquid phase and to a reflux condensation zone for supplying reflux for fractionation of the liquid phase produced in said rich gas condensation zone comprising a source for liquid refrigerant, conduits from said source to said rich gas condensation zone and said reflux condensation zone, outlet conduits for refrigerant vapors from said rich gas condensation zone and said reflux condensation zone, an accummulator to receive condensed reflux from said reflux condensation zone, a valve in said outlet conduit from said reflux condensation zone, a controller for varying the setting of said valve responsive to the liquid level in said accumulator, a valve in said outlet from said rich gas condensation zone, and a controller for varying the setting of said last named valve responsive to pressure reduction of refrigerant vapors passing through said first valve.

12. Apparatus for supplying refrigerant to a rich gas condensation zone for the condensation of a gas mixture to the liquid phase and to a reflux condensation zone for supplying reflux for fractionation of the liquid phase produced in said rich gas condensation zone comprising a source for liquid refrigerant, conduits from said source to said rich gas condensation zone and said reflux condensation zone, liquid level controls associated with said conduits and said condensation zones to maintain predetermined liquid levels in said condensation zones, an accumulator to receive condensed reflux from said reflux condensation zone, a pilot responsive to the liquid level in said reflux accumulator, outlet conduits for refrigerant vapors from said rich gas condensation zone and said reflux condensation zone, a valve in said outlet conduit from said reflux condensation zone, means for varying the setting of said valve responsive to said pilot, a valve in said outlet from said rich gas condensation zone, a controller responsive to pressure reduction of refrigerant vapors passing through said first named valve, and means for varying the setting of said last named valve responsive to said controller.

13. In a process for treating a gas containing at least two constituents condensable to the liquid phase for the separation and recovery of at least one of said constituents, the steps comprising cooling said gas to a temperature sufficiently low to condense at least a portion of any water contained in said gas but above a temperature at which hydrocarbon hydrates will form, separating any of said condensed water from the remaining constituents of said gas, separating non-aqueous liquid phase condensed from said gas as a result of said cooling from the remaining uncondensed portion of said gas, subjecting said liquid phase to the action of a first body of solid desiccant, subjecting the uncondensed portion of said gas to the action of a second body of solid desiccant, admixing said liquid phase with said uncondensed portion of said gas, passing the resulting mixture of said liquid phase and said uncondensed portion of said gas to a refrigeration zone, passing a liquid refrigerant from a source of refrigerant to said refrigeration zone, boiling said liquid refrigerant in said refrigeration zone to condense at least all but the least condensable of said two constituents of said gas condensable to the liquid phase, passing the refrigerant vapor produced by boiling from said refrigeration zone through a pressure reduction zone, separating from the resulting liquid phase said least condensable of said two constituents of said gas condensable to the liquid phase, fractionating said liquid phase in a fractionation zone to separate at least one constituent thereof, passing overhead from said fractionation zone to a refrigeration zone, passing a liquid refrigerant from said previously mentioned source to said last-named refrigeration zone, boiling said liquid refrigerant in said last-named refrigeration zone to condense said overhead, passing refrigerant vapor from said last-named refrigeration zone through a pressure reduction zone, maintaining the pressure reduction of said vapor through said pressure reduction zone not less than a predetermined value, correlating the pressure reduction of said vapor through said first-named pressure reduction zone with the pressure reduction of said vapor through said last-named pressure reduction zone, combining refrigerant vapors from both said refrigeration zones, condensing said vapors by compression and removal of heat of compression therefrom, returning said condensed refrigerant to said source, returning at least a part of said condensed overhead as reflux to said fractionation zone, and recovering bottoms from said fractionation zone.

WILL SWERDLOFF.

REFERENCES CITED

The following references are of record in the file of this patent:

UNITED STATES PATENTS

| Number | Name | Date |
|---|---|---|
| 1,213,795 | Felt | Jan. 23, 1917 |
| 1,213,796 | Felt | Jan. 23, 1917 |
| 1,831,644 | Adair | Nov. 10, 1931 |
| 2,028,432 | Barton | Jan. 21, 1936 |
| 2,224,227 | Keith | Dec. 10, 1940 |
| 2,225,045 | Gerlach | Dec. 17, 1940 |
| 2,258,015 | Keith | Oct. 7, 1941 |
| 2,355,589 | Brandt | Aug. 8, 1944 |
| 2,389,604 | Dowding | Nov. 27, 1945 |
| 2,501,999 | Fausek | Mar. 28, 1950 |
| 2,506,350 | De Baufre | May 2, 1950 |